(12) United States Patent
Burgoon et al.

(10) Patent No.: US 6,171,034 B1
(45) Date of Patent: Jan. 9, 2001

(54) COMBINATION MOTORCYCLE TIE-DOWN AND LOCK DEVICE

(75) Inventors: Stephen Burgoon, Boyertown; Vincent Ricci, Douglassville, both of PA (US)

(73) Assignee: R-B Machine, Inc., Boyertown, PA (US)

( * ) Notice: Under 35 U.S.C. 154(b), the term of this patent shall be extended for 0 days.

(21) Appl. No.: 09/157,775

(22) Filed: Sep. 21, 1998

(51) Int. Cl.[7] .................................................. B60P 7/08
(52) U.S. Cl. ........................... 410/3; 410/11; 410/23; 410/97; 410/106
(58) Field of Search ................................. 410/2, 3, 4, 10, 410/11, 12, 23, 106, 96, 97, 99, 100; 224/534, 535, 568, 569, 924; 248/499; 24/265 CD

(56) References Cited

U.S. PATENT DOCUMENTS

| | | | |
|---|---|---|---|
| 1,733,269 | * 10/1929 | Mauk et al. | 410/10 |
| 3,912,139 | * 10/1975 | Bowman | 410/3 |
| 3,923,220 | * 12/1975 | Marcyan . | |
| 4,078,821 | * 3/1978 | Kitterman | 410/3 X |
| 4,265,478 | * 5/1981 | Korsgaard | 410/23 X |
| 4,441,736 | * 4/1984 | Shedden | 410/2 X |
| 4,842,458 | * 6/1989 | Carpenter | 410/3 |
| 5,326,202 | * 7/1994 | Stubbs | 410/3 |
| 5,529,448 | * 6/1996 | Kosma | 410/97 |

FOREIGN PATENT DOCUMENTS

2271093A * 4/1994 (GB) ..................... 224/924

* cited by examiner

*Primary Examiner*—Stephen T. Gordon
(74) *Attorney, Agent, or Firm*—Joseph M. Konieczny; John F. A. Earley; Harding, Earley, Follmer & Frailey

(57) ABSTRACT

A combination tie-down and locking device for a motorcycle having a plurality of forks. The device has a cut-resistant shackle for clamping around the fork of the motorcycle, a flexible, cut-resistant tie-down strap having one end securely fixed to the shackle, a quick-connect chain link for tensioning the strap and releasably connecting the free end of the strap to a trailer, and a lock for releasably locking the free end of the strap to a trailer. A method of tying down and locking a motorcycle to a trailer includes the steps of providing a pair of combination tie-down and locking devices, tightening the devices on each of the forks of the motorcycle, locking the device on each of the forks of the motorcycle, tensioning the tie-down strap and connecting the free end of the tie down strap to the trailer, and locking the free end of the tie down strap to the trailer.

13 Claims, 2 Drawing Sheets

Figure 3:
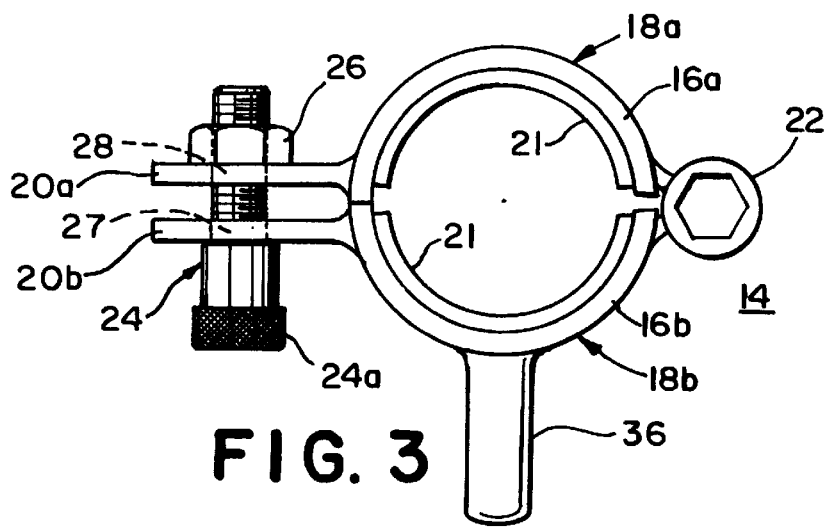
Figure 4:
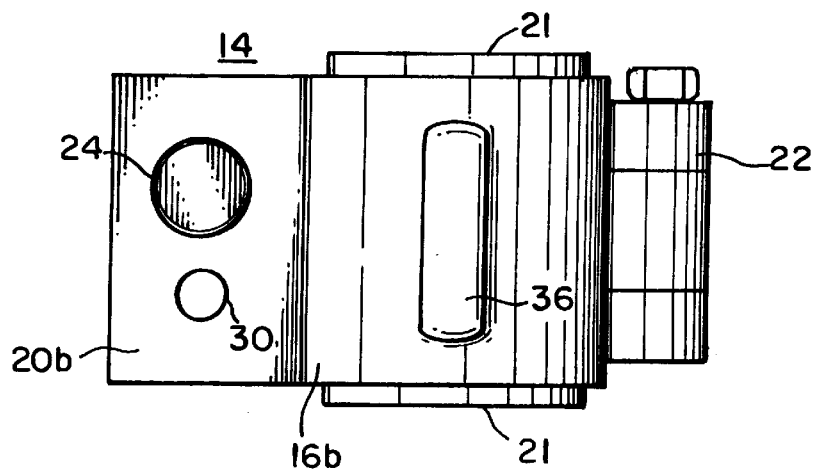
Figures 5, 6:
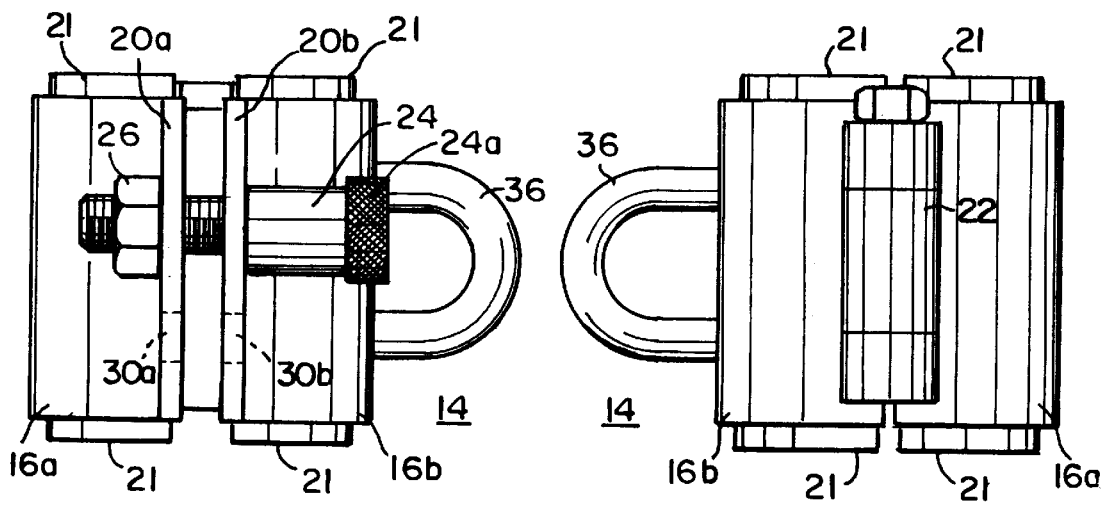
Figure 7:
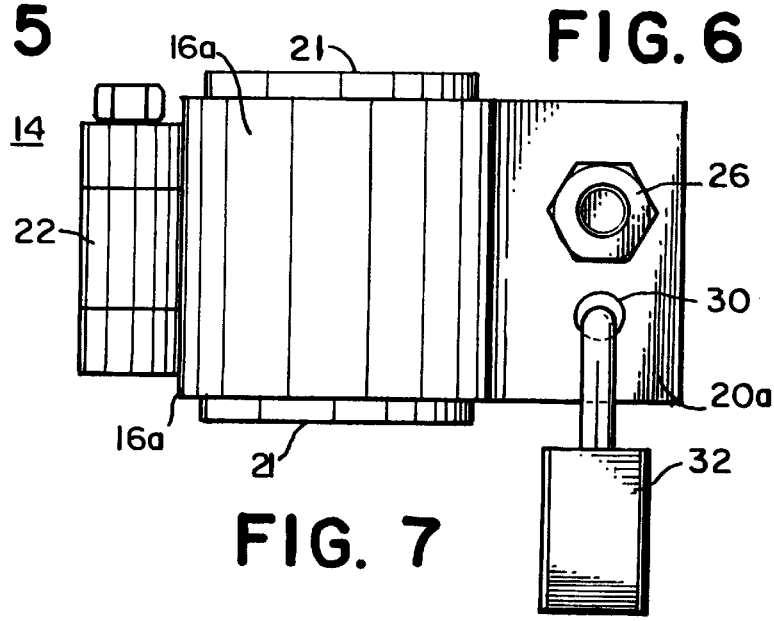

COMBINATION MOTORCYCLE TIE-DOWN AND LOCK DEVICE

FIELD OF THE INVENTION

The present invention relates to a combination device for tying down and locking a motorcycle to a trailer during towing.

BACKGROUND OF THE INVENTION

Many devices are known for tying down a motorcycle to a trailer during towing. For example, U.S. Pat. Nos. 4,078,821, 4,243,243, 4,852,779, 5,529,448, 5,326,202, 4,752,177, 4,441,736, 4,072,257 teach various utility trailers, stabilizing hitches, racks, hand grip mounts, strapping systems, and suspension wear reducers for towing or carrying a motorcycle. While the devices disclosed in the aforementioned patents are useful in carrying or towing a motorcycle, none of the aforementioned devices also provide security for the motorcycle. Therefore, it would be desirable to provide a device which not only secures the motorcycle to the bed of a trailer or truck, but also securely locks the motorcycle to the bed.

Many prior art motorcycle restraint devices scratch or indent the motorcycle when the restraint is fastened thereto. For example, the tie-down rod 89 disclosed in U.S. Pat. No. 4,078,821 includes hose clamps 109 and a pin 107 which, when secured to the frame member 93 of the motorcycle, will scratch the paint on the frame and possibly indent the frame. Therefore, it would be desirable to provide a motorcycle restraint device which does not damage the motorcycle in any way when attached to the motorcycle.

Many prior art restraint devices utilize tie-down straps made of nylon, leather or other slightly elastic material. In order to insure that the straps remain taught, the forks of the motorcycle are greatly compressed before tightening the straps to account for stretching during travel. Compression of the motorcycle forks is undesirable and causes damage over a long period of time. Therefor, it would also be desirable to provide an inelastic motorcycle restraint device which does not require excessive compression of the motorcycle forks.

SUMMARY OF THE INVENTION

The combination tie-down and locking device of the present invention comprises a cut-resistant shackle for clamping around the fork of the motorcycle, a flexible, cut-resistant tie down strap fixed to the shackle, means for tensioning the strap and releasably connecting the free end of the strap to a trailer bed, and means for releasably locking the free end of the strap to the trailer bed.

The shackle has a pair of clamp halves pivotally connected by a hinge. The clamp halves have a semi-circular center portion and a tab fixed to and extending from the center portion. The clamp halves have a scratch-resistant lining on the inner surface of the center portion. The scratch-resistant lining may be PVC tubing, rubber, Teflon, felt or other similar material. Preferably, the clamp halves having an inner diameter in the range of 39–41 mm to engage the forks on the most common motorcycles. However, the shackles can be customized to engage any diameter fork.

The shackle has means for releasably opening, closing and tightening the clamp halves together. Preferably, the means for releasably opening, closing and tightening the clamp halves comprises bolt means extending from one tab to the other tab. The bolt means preferably comprises a thumb screw which can be tightened by hand.

The shackle has means for releasably locking the clamp halves together around the motorcycle fork. Preferably, the shackle locking means comprises a through bore in the tab of each clamp halve and a padlock having a shank diameter smaller than the diameter of the through bores.

The tie down strap preferably comprises a hardened-steel chain. The releasable connecting and tensioning means preferably comprises a quick-connect chain link. The strap locking means comprises a pad lock having a shank diameter smaller than the inner diameter of the links of the chain.

The present invention also provides a method of tying down and locking a motorcycle to a trailer bed. The method comprises the steps of providing a pair of combination tie-down and locking devices such as described above. The shackle of the device is then tightened on each of the forks of the motorcycle. The shackle is locked on each of the forks of the motorcycle by applying a padlock through the tabs of the shackle. The tie down chain is tensioned and connected to the trailer. The chain is tensioned by slightly compressing the forks of motorcycle and releasably connecting an intermediate link of the chain to the trailer bed. The free end of the tie down chain is then looped through an aperture in the trailer and locked to another intermediate link on the chain to form a closed loop connection to the trailer bed.

BRIEF DESCRIPTION OF THE DRAWINGS

FIG. 1 is a front elevation of a motorcycle tied down and locked with an embodiment of the combination device of the present invention;

FIG. 2 is an enlarged side elevation of the connection point of the tie down chain of FIG. 1 and a trailer bed;

FIG. 3 is a top plan view of a shackle in accordance with an embodiment of the invention;

FIG. 4 is a front elevation of the shackle of FIG. 3;

FIG. 5 is a left side elevation of the shackle of FIG. 3;

FIG. 6 is a right side elevation of the shackle of FIG. 3; and,

FIG. 7 is a back elevation of the shackle of FIG. 3 including a pad lock.

DETAILED DESCRIPTION OF PREFERRED EMBODIMENTS

The combination tie down and locking device of the present invention is described below with reference to FIGS. 1–7 wherein like reference numerals are used throughout to indicate like elements.

Referring to FIG. 1, the combination tie down and locking device is designated generally by reference numeral 10. The combination device 10 is preferably used with, and is described below with reference to, a motorcycle while towing the motorcycle on a trailer bed 12. However, it should be readily obvious to one of ordinary skill in the art that the combination device of the present invention may also be used to lock a motorcycle at any location by securing the free end of the combination device to a stationary object.

The combination device 10 of the present invention has a cut-resistant shackle 14 which is designed to clamp around the fork of a motorcycle. Referring to FIGS. 3–7, the shackle comprises two clamp halves 16*a*, 16*b* pivotly connected by a hinge 22. The clamp halves 16*a*, 16*b* are preferably made of a cut-resistant material such as hardened steel.

The clamp halves 16*a*, 16*b* have a semi-circular center portion 18 and a tab 20 fixed to and extending from the center portion 18. The tabs 20 comprise generally rectangular plates extending perpendicular to the outer surface of the center portion 18 of the clamp halves 16. The tabs 20 may be integrally formed with the center portion or comprise separate pieces welded thereto. The tabs are arranged on the center portions of the clamp halves 16 so that the tabs are in close, parallel arrangement when the shackle is closed as best seen in FIGS. 3 and 5.

The inner surface of the center portion 18 of the clamp halves 16 is preferably lined with a scratch-resistant material 21 such as PVC tubing, rubber, Teflon, or felt so that the shackles do not scratch or indent the motorcycle forks when attached thereto. The scratch-resistant lining 21 preferably extends upwardly and downwardly over the upper and lower end surfaces of the clamp halves as seen in FIGS. 4–7.

The shackle 14 includes means for releasably opening, closing and tightening the clamp halves relative to one another. In a preferred embodiment, the opening, closing and tightening means comprises a bolt 24 traversing both tabs 20a, 20b. The bolt is preferably a thumb screw having an enlarged, knurled head 24a which can be tightened and loosened by hand. The thumb screw 24 extends through a bore 27 in one flange 20b and into a threaded seat 26 in the other tab 20a. In a preferred embodiment, the threaded seat 26 comprises a nut welded to the tab 20a coaxial with a bore 28 extending through the tab. Alternatively, the tabs could be made of sufficient thickness such that the threaded seat could be formed by tapping the bore 28.

The shackle 14 also includes means for releasably locking the clamp halves 16 together around the motorcycle fork 8. In a preferred embodiment, the shackle locking means comprises a pair of axially-aligned bores 30a, 30b extending through the tabs 20. A pad lock 32 having a shank diameter smaller than the diameter of the aligned bores 30a, 30b releasably locks the clamp halves together.

The center portion 18 of the clamp halves 16 preferably has a diameter in the range of about 39 to 41 millimeters which is the average size of a motorcycle fork. The clamp halves 16 are dimensioned so that the shackle has an inner contour which compliments the outer surface of the fork. However, the shackles can be made with other diameters to engage larger or smaller forks.

The shackle 14 has a flexible, cut-resistant tie down strap securely fixed thereto. In a preferred embodiment, the strap comprises a hardened steel chain 34. The chain 34 is connected to the shackle by a link loop 36 fixed to the outer surface of the center portion 18 of one of the clamp halves 16b.

Figure 1:
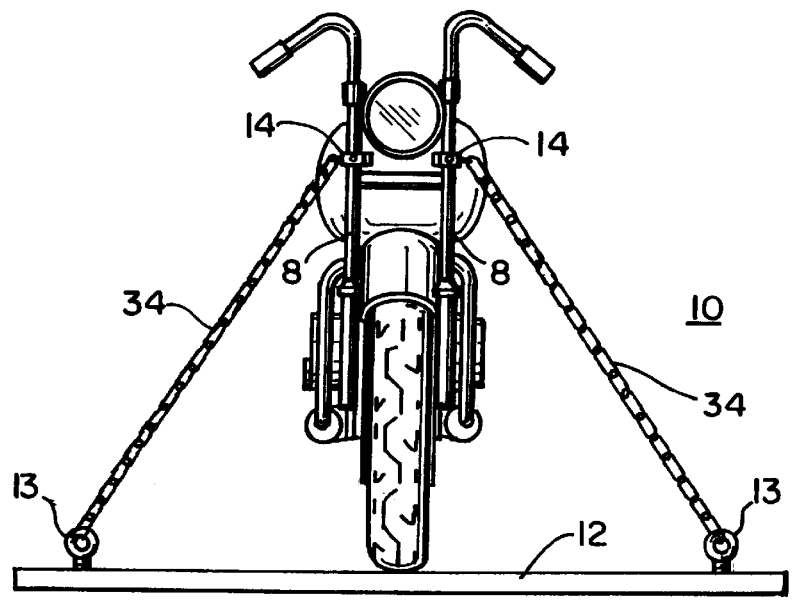
Figure 2:
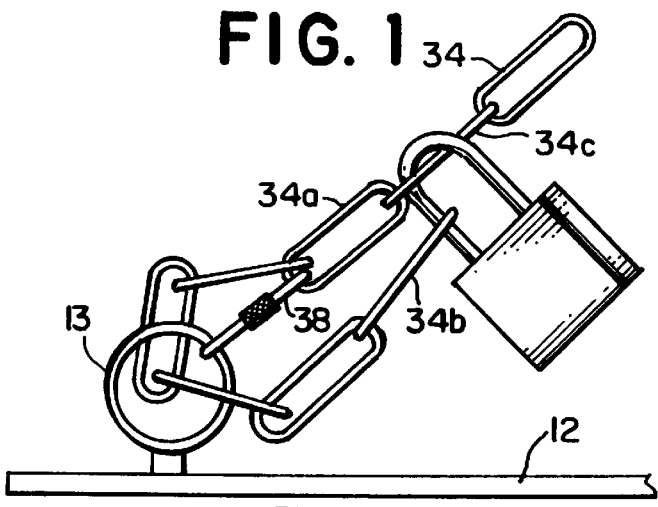

The tie down chain 34 is preferably about 6 to 8 feet in length. The tie down chain 34 includes a quick-connect chain link 38 which releasably connects and tensions the free end of the chain 34 to the trailer bed 12. Excess chain is provided so that a closed, locked loop can be formed with the trailer bed 12. Referring to FIG. 2, an intermediate link 34a is connected to an eye bolt 13 on the trailer by the quick-connect link 38. The excess or free end of the chain 34b is passed through the eye bolt 13 and locked to another intermediate link 34c of the chain 34. This closed-loop connection inhibits theft of the motorcycle if the quick-connect link is removed by a thief. The closed-loop connection also provides a back up safety connection in the event the quick-connect link becomes accidently disconnected or fails.

The combination device 10 of the present invention is preferably used during towing of a motorcycle on the bed 12 of a trailer or pick-up truck. However, due to the device's light weight and compact design, the device can be maintained in a carry bag on the motorcycle and used as a primary or secondary lock at any location.

In the method of the present invention, a pair of the above-described tie-down and locking devices are first tightened to each of the forks of the motorcycle. The shackle 14 can be tightened by hand by turning the enlarged-head thumb screw. The shackle is then locked on the fork by applying a pad lock through the aligned bores 30a, 30b in the tabs of the shackle 14.

To tie-down the motorcycle to the trailer, the tie down chain 34 is connected to the trailer after slightly compressing the forks of the motorcycle. Unlike prior art belt straps, the forks of the motorcycle need not be compressed very far since there is little or no expansion slack in the combination device of the present invention since it is made of steel. The free end of the chain 34b is then looped through any aperture in the trailer and locked to an intermediate link 34c on the chain 34 to form a closed loop connection.

What is claimed is:

1. A combination tie-down and locking device for a motorcycle having a plurality of forks, comprising:
   a) a cut-resistant shackle for clamping around the motorcycle, said shackle having:
      a) a pair of clamp halves;
      b) a hinge pivotally connecting said clamp halves;
      c) means for releasably opening, closing and tightening said clamp halves;
      d) means for releasably locking said clamp halves together around the motorcycle;
   b) a flexible, cut-resistant tie down strap having one end securely fixed to said shackle, and a free end,
   c) means for tensioning said strap and releasably connecting the free end of said strap to a trailer; and,
   d) means for releasably locking the free end of said strap to a trailer.

2. The device recited in claim 1, each of said clamp halves having a semi-circular center portion and a tab fixed to and extending from the center portion.

3. The device recited in claim 2, said clamp halves having a scratch-resistant lining on the inner surface of said center portion.

4. The device recited in claim 3, said scratch-resistant lining being selected from the group comprising PVC tubing, rubber, or felt.

5. The device recited in claim 2, said means for releasably opening, closing and tightening said clamp halves comprising hand-tightenable bolt means extending from one of said tabs to the other of said tabs.

6. The device recited in claim 5, said bolt means comprising a thumb screw.

7. The device recited in claim 2, each of said tabs having a through bore.

8. The device recited in claim 7, said clamp halve locking means comprising a padlock having a shank diameter smaller than the diameter of said through bores.

9. The device recited in claim 4, said clamp halves having an inner diameter in the range of 39–41 mm.

10. The device recited in claim 1, said tie down strap comprising a hardened-steel chain.

11. The device recited in claim 10, said releasable connecting and tensioning means comprising a quick-connect chain link.

12. The device recited in claim 10, said strap locking means comprising a pad lock having a shank diameter smaller than the inner diameter of the links of said chain.

13. A combination tie-down and locking device for a motorcycle having a plurality of forks, comprising:
   a) a cut-resistant shackle for clamping around the motorcycle, said shackle having:
      a) a pair of clamp halves;
      b) a hinge pivotally connecting said clamp halves;
      c) means for releasably opening, closing and tightening said clamp halves;
      d) means for releasably locking said clamp halves together around the motorcycle;
   b) a flexible, cut-resistant tie down strap having one end securely fixed to said shackle, and a free end,
   c) means for tensioning said strap and releasably connecting the free end of said strap to a trailer; and,
   d) means for releasably locking the free end of said strap to a trailer;
   each of said clamp halves having a semi-circular center portion and a tab fixed to and extending from the center portion;
   said clamp halves having a scratch-resistant lining on the inner surface of said center portion;
   said scratch-resistant lining being selected from the group consisting of PVC tubing, rubber, or felt;
   said means for releasably opening, closing and tightening said clamp halves comprising bolt means extending from one tab to the other tab;
   said bolt means comprising a thumb screw;
   each of said tabs having a through bore;
   said clamp halve locking means comprising a padlock having a shank diameter smaller than the diameter of said through bores;
   said clamp halves having an inner diameter in the range of 39–41 mm;
   said tie down strap comprising a hardened-steel chain;
   said releasable connecting and tensioning means comprising a quick-connect chain link;
   said strap locking means comprising a pad lock having a shank diameter smaller than the inner diameter of the links of said chain.

* * * * *